US010811971B2

(12) United States Patent
Ke et al.

(10) Patent No.: US 10,811,971 B2
(45) Date of Patent: Oct. 20, 2020

(54) MULTIPLE-PHASE SWITCHED-CAPACITOR-INDUCTOR BOOST CONVERTER TECHNIQUES

(71) Applicant: Analog Devices International Unlimited Company, Limerick (IE)

(72) Inventors: Xugang Ke, Santa Clara, CA (US); Min Chen, Fremont, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/255,510

(22) Filed: Jan. 23, 2019

(65) Prior Publication Data
US 2020/0235666 A1    Jul. 23, 2020

(51) Int. Cl.
*H02M 3/158* (2006.01)
*H02M 1/096* (2006.01)
*H02M 1/00* (2006.01)

(52) U.S. Cl.
CPC ......... *H02M 3/1582* (2013.01); *H02M 1/096* (2013.01); *H02M 2001/0009* (2013.01)

(58) Field of Classification Search
CPC .... H02M 3/00; H02M 3/02; H02M 2003/075; H02M 2003/076; H02M 2003/077; H02M 3/145; H02M 3/156; H02M 3/157; H02M 3/158; H02M 3/1582; H02M 1/096; H02M 2001/0009
See application file for complete search history.

(56) References Cited

U.S. PATENT DOCUMENTS

| 4,513,361 | A | 4/1985 | Rensink |
| 5,886,891 | A | 3/1999 | Jiang et al. |
| 6,043,997 | A | 3/2000 | Jacobs et al. |
| 7,023,186 | B2 | 4/2006 | Yan |
| 7,518,886 | B1 | 4/2009 | Lai et al. |
| 7,535,204 | B1 * | 5/2009 | Nadimpalli ......... H02M 3/1584 323/222 |

(Continued)

FOREIGN PATENT DOCUMENTS

| EP | 2259416 A2 | 12/2010 |
| WO | WO-2015123459 A1 | 8/2015 |

OTHER PUBLICATIONS

Butti, G., et al., "Novel High Efficiency Multilevel DC-DC Boost Converter Topologies and Modulation Strategies", 14th European Conference on Power Electronics and Applications; Birmingham, UK, (2011), 11 pgs.

(Continued)

*Primary Examiner* — Adolf D Berhane
(74) *Attorney, Agent, or Firm* — Schwegman Lundberg & Woessner, P.A.

(57) ABSTRACT

Techniques for multiple-phase, high-boost converters are provided. In an example, a multiple-phase switched-capacitor-inductor (MPSCI) boost converter can include a first phase circuit, a second phase circuit, and a capacitor. Each of the first phase circuit and the second phase circuit can include a first switch, an inductor having a first node coupled to a first supply rail, and a second switch configured to selectively couple a second node of the inductor to a second supply rail. The capacitor can be coupled between the second node of the inductor of the second phase circuit and the first switch of the second phase circuit.

25 Claims, 9 Drawing Sheets

(56) References Cited

U.S. PATENT DOCUMENTS

| | | | |
|---|---|---|---|
| 7,977,898 | B2 | 7/2011 | Jang et al. |
| 8,710,810 | B1* | 4/2014 | McJimsey .......... H02M 3/1584 323/272 |
| 9,559,589 | B2 | 1/2017 | Petersen |
| 9,698,691 | B2* | 7/2017 | Ozanoglu .......... H02M 3/1582 |
| 2011/0205762 | A1 | 8/2011 | Pan et al. |
| 2013/0301314 | A1* | 11/2013 | Fu .................... H02M 7/487 363/37 |
| 2014/0111179 | A1 | 4/2014 | Couleur et al. |
| 2014/0334196 | A1 | 11/2014 | Chen et al. |
| 2015/0002115 | A1* | 1/2015 | Shenoy .............. H02M 3/158 323/271 |
| 2015/0188437 | A1* | 7/2015 | Chan ................. H02M 3/1584 363/46 |
| 2015/0263644 | A1 | 9/2015 | Fu |
| 2016/0261184 | A1 | 9/2016 | Chen et al. |
| 2016/0261190 | A1* | 9/2016 | Shenoy .............. H02M 3/158 |
| 2016/0285371 | A1 | 9/2016 | Fu |
| 2016/0294278 | A1 | 10/2016 | Li et al. |
| 2017/0324332 | A1* | 11/2017 | Molari .................. G05F 1/10 |

OTHER PUBLICATIONS

Chang, Yuen-Haw, et al., "A Closed-Loop High-Gain Multiphase-Switched-Capacitor-Inductor Step-Up DC-DC Converter", Proc. of the Intl. MultiConference of Engineers and Computer Scientists, vol. 2, (Mar. 2015), 6 pgs.

Dinesh K, "Analysis of Multiphase Boost Converter for High Power Application", International Journal of Applied Information Systems, vol. 1, No.7, (Mar. 2012), 6 pgs.

Farooq, Ajmal, "A Three Phase Interleaved Boost Converter with L & C Voltage Extension Mechanism", Technical Gazette 25(1), (2018), 52-59.

Garcia, F. S., et al., "Modeling and Control Design of the Six-Phase Interleaved Double Dual Boost Converter", 9th IEEE/IAS Intl. Conference on Industry Applications, (2010), 6 pgs.

Hu, Yihua, et al., "Three-phase interleaved high-step-up converter with coupled-inductor-based voltage quadrupler", IET Power Electronics, vol. 7, Iss. 7, (2014), 1841-1849.

Lopez-Santos, Oswaldo, et al., "Efficiency analysis of a sliding-mode controlled quadratic boost converter", IET Power Electronics, vol. 6, Iss. 2, (2013), 364-373.

Pan, Ching-Tsai, et al., "A High-Efficiency High Step-Up Converter With Low Switch Voltage Stress for Fuel-Cell System Applications", IEEE Transactions on Industrial Electronics, vol. 57, No. 6, (Jun. 2010), 9 pgs.

Pop-Calimanu, Ioana-Monica, et al., "New Multiphase Hybrid Boost Converter with Wide Conversion Ratio for PV System", International Journal of Photoenergy, vol. 2014, Art. 637468, (Apr. 30, 2014), 17 pgs.

Thounthong, Phatiphat, "Control of a Three-Level Boost Converter Based on a Differential Flatness Approach for Fuel Cell Vehicle Applications", IEEE Transactions on Vehicular Technology, vol. 61, No. 3, (Mar. 2012), 6 pgs.

Yoon, Changwoo, et al., "Multiphase DC-DC Converters Using a Boost-Half-Bridge Cell for High-Voltage and High-Power Applications", IEEE Transactions of Power Electronics, vol. 26, No. 2, (Feb. 2011), 8 pgs.

Yun, Jae-Jung, "A New Dual Boost DC/DC Converter with a Voltage Conversion Gain", Indian Journal of Science and Technology, vol. 9(17), (May 2016), 6 pgs.

* cited by examiner

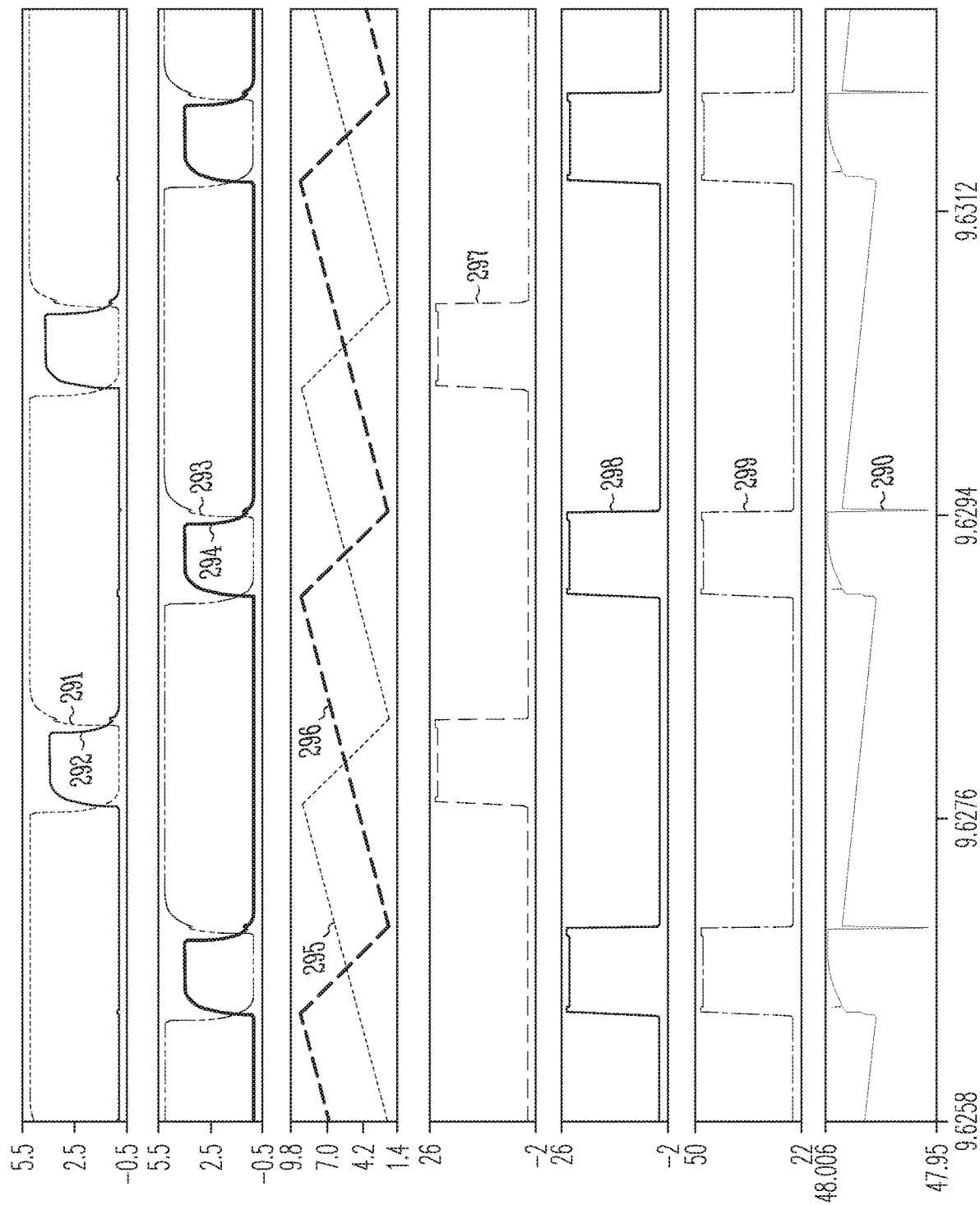

MULTIPLE-PHASE SWITCHED-CAPACITOR-INDUCTOR BOOST CONVERTER TECHNIQUES

TECHNICAL FIELD OF THE DISCLOSURE

The present subject matter discusses voltage converter techniques and more particularly, multiple-phase switched-capacitor-inductor boost converter techniques

BACKGROUND

Single-phase boost converters can be employed in a large variety of applications. However, as the switching frequency increases or input voltage decreases due to normal variation such as load demand, a single-phase boost converter can struggle to provide a robust and reliable high-boost voltage due to the long signal propagation delays in gate driver and feedback controller. In addition, as the boost ratio increases, larger, high-voltage, switches can be required to tolerate the full output voltage. Such switches can include larger parasitic capacitances which can further increase the propagation delay in gate driver, and limit switching frequency and boost ratio, for example, due to the minimum on-time of the upper switch of the single-phase boost converter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2 illustrates graphically various signals of an example MPSCI boost converter such as the example two-phase SCI boost converter of FIG. 1.

DETAILED DESCRIPTION

Figure 1A:
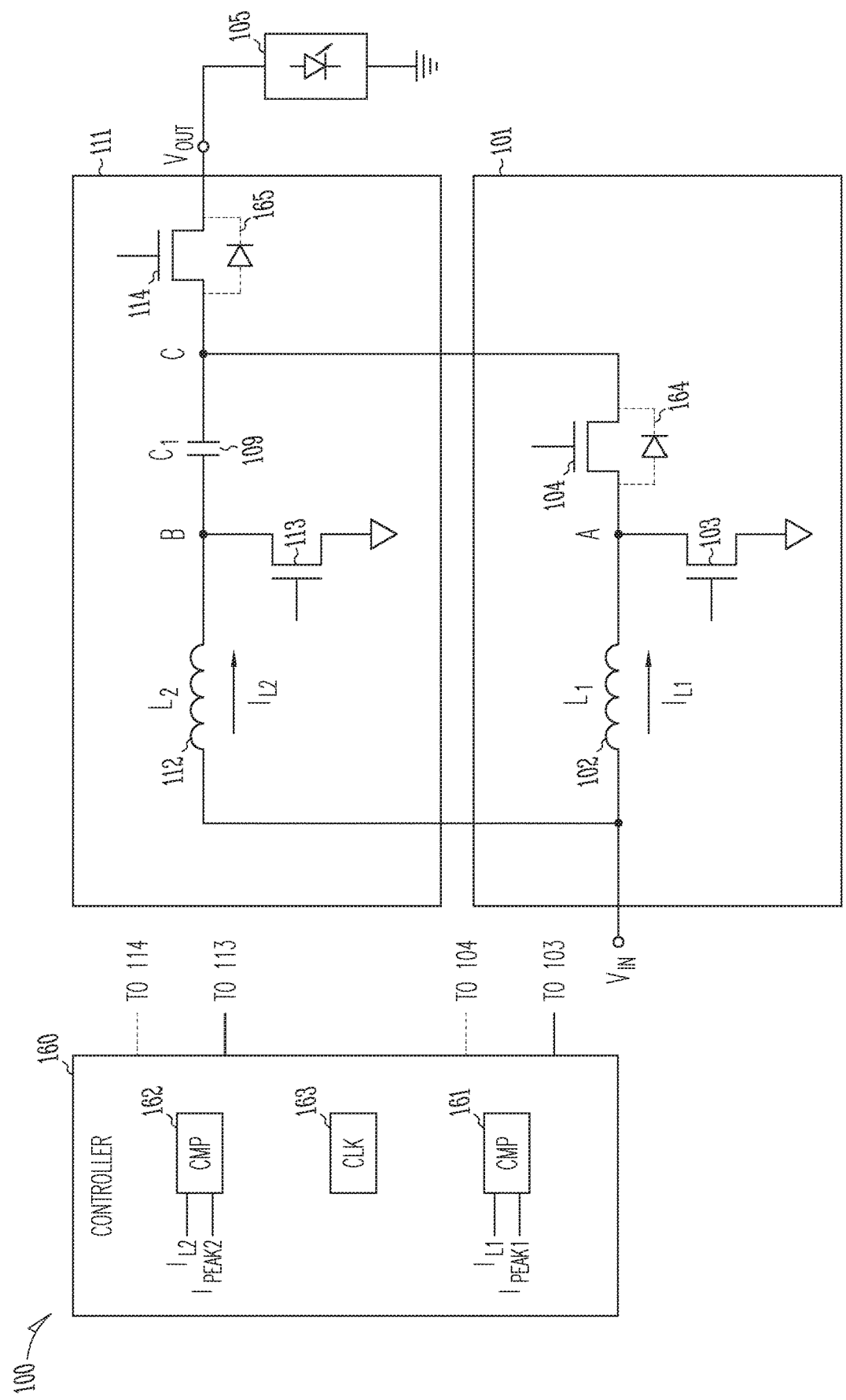
FIG. 1A illustrates generally an example multiple-phase, switched-capacitor-inductor (MPSCI) boost converter.

FIG. 1A illustrates generally an example multiple-phase, switched-capacitor-inductor (MPSCI) boost converter 100 for providing an output voltage ($V_{OUT}$) to a load 105 such as a fixed or mobile light detection and ranging (LIDAR) sensor or system, or a light-emitting diode (LED) driver. The MPSCI boost converter 100 can include a first phase circuit 101, a second phase circuit 111 and a controller 160. In certain examples, the controller 160, or control circuitry, can include a clock generator 163 for generating one or more clock signals. In some examples, the clock generator 163 can be separate from the controller 160. The first and second phase circuits 101, 111 can each include an inductor 102, 112, a bottom switch 103, 113, and a top switch 104, 114. The second phase circuit 111 can include a capacitor 109. In general, each phase circuit 101, 111 induces current ($I_{L1}, I_{L2}$) in the corresponding inductor 102, 112 using the supply power source (VIN) and the corresponding bottom switch 103, 113. The current ($I_{L1}, I_{L2}$) of each inductor 102, 112 can then be switched to an output of the phase circuit 101, 111 via the corresponding top switch 104, 114. The switching of the phase circuit switches 103, 104, 113, 114 can be sequenced to provide a regulated output voltage (VOUT) and operate the MPSCI boost converter 100 efficiently. The capacitor 109 can be placed to store the boosted charge in the first phase 101, and further bridge the second phase and pass the inductor current energy to the output (VOUT).

More specifically, upon a first clock signal of the controller 160, the bottom switch 103 of the first phase circuit 101 can be turned "on", or placed in a low impedance state, and the current ($I_{L1}$) of the inductor 102 of the first phase circuit 101 can begin and can ramp up in magnitude. As the current ($I_{L1}$) of the inductor 102 of the first phase circuit 101 ramps to a peak current threshold, a first comparator 161, or first comparator circuit, of the controller 160 can change states and the can toggle the states of the bottom switch 103 and the top switch 104 of the first phase circuit 101 such that the bottom switch 103 turns "off" and the top switch 104 turns "on". Because of the change of states of the top and bottom switches 104, 103 of the first phase circuit 101, the current ($I_{L1}$) of the inductor 102 of the first phase circuit 101 can begin to ramp down in magnitude.

In a similar fashion, upon a second clock signal of the controller 160, the bottom switch 113 of the second phase circuit 111 can be turned "on", or placed in a low impedance state, and the current ($I_{L2}$) of the inductor 112 of the second phase circuit 111 can begin and can ramp up in magnitude. As the current ($I_{L2}$) of the inductor 112 of the second phase circuit 111 ramps to a peak current threshold, a second comparator 162, or second comparator circuit, of the controller 160 can change states and the can toggle the states of the bottom switch 113 and the top switch 114 of the second phase circuit 111 such that the bottom switch 113 turns "off" and the top switch 114 turns "on". Because of the change of states of the top and bottom switches 114, 113 of the second phase circuit 111, the current ($I_{L2}$) of the inductor 112 of the second phase circuit 111 can begin to ramp down in magnitude.

In certain examples, the first and second clock signals of the controller 160 are staggered. In some examples, the first and second clock signals are equally staggered over an interval of time. The staggered signals of the first and second clock signal scan allow the current ($I_{L1}$) of the inductor 102 of the first phase circuit 101 to charge the capacitor 109 of the second phase circuit 111 when the top switch 104 of the first phase circuit is "on". In addition, when the top switch 114 of the second phase circuit 111 is turned "on", the current ($I_{L2}$) of the inductor 112 of the second phase circuit is and the charged voltage across the capacitor 109 of the second phase circuit 111 can be passed to the output node of the MPSCI boost converter 100. As a result, the output voltage (VOUT) of the MPSCI boost converter 100 can be given by, $$V_{OUT} = N \cdot \frac{V_{IN}}{1-D},$$

where N is the number of phases, and D is the duty cycle of the bottom switch of each phase, and for simplicity, assumes the duty cycle for each switch is the same. In certain examples, the top switch (104, 114) of one or more of the first or second phase circuits 101, 111 can be replaced by a diode 164, 165 or similar device for an asynchronous MPSCI boost converter.

Figure 1B:
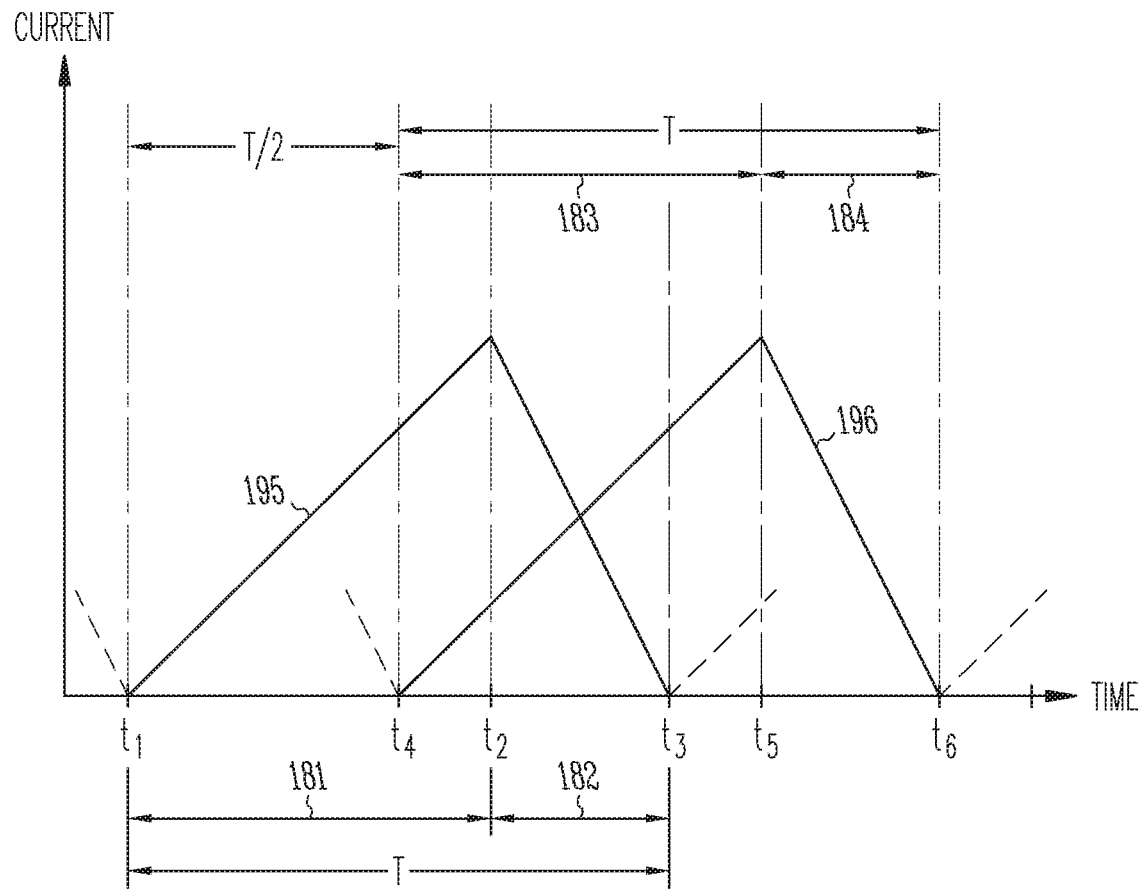
FIG. 1B illustrates generally a plot of inductor current for a two-phase SCI boost converter.

FIG. 1B illustrates generally a plot of inductor current for a two-phase SCI boost converter. The plot can include first plot 195 of current for a first phase circuit inductor and a second plot 196 of current for a second phase circuit inductor. Between t1 and t2, at 181, the bottom switch of the first phase is "on" and the inductor current 195 ($I_{L1}$) of the first phase ramps up. Between t2 and t3, at 182, the bottom switch of the first phase is "off" and the inductor current 195 ($I_{L1}$) of the first phase ramps down. Between t4 and t5, at 183, the bottom switch of the second phase is "on" and the inductor current 196 ($I_{L2}$) of the second phase ramps up. Between t5 and t6, at 184, the bottom switch of the second phase is "off" and the inductor current 196 ($I_{L2}$) of the second phase ramps down. The plot also shows the period (T) of the switching frequency of the two-phase SCI boost converter and that the transitions of the corresponding switches of each phase can be evenly distributed (T/2) over the period (T) of the switching frequency.

FIG. 2 illustrates graphically various signals of an example MPSCI boost converter such as the example two-phase SCI boost converter of FIG. 1. The various signals include the control node voltage 291 of the bottom switch of the first phase circuit, the control node voltage 292 of the top switch of the first phase circuit, the control node voltage 293 of the bottom switch of the second phase circuit, the control node voltage 294 of the top switch of the second phase circuit, the current 295 ($I_{L1}$) of the inductor of the first phase circuit, the current 296 ($I_{L2}$) of the inductor of the second phase circuit, the voltage 297 at node A, the voltage 298 at node B, the voltage 299 across the capacitor 109 from node C to node B, and the output voltage ($V_{OUT}$) 290 of the two-phase SCI boost converter 100.

Figure 3:
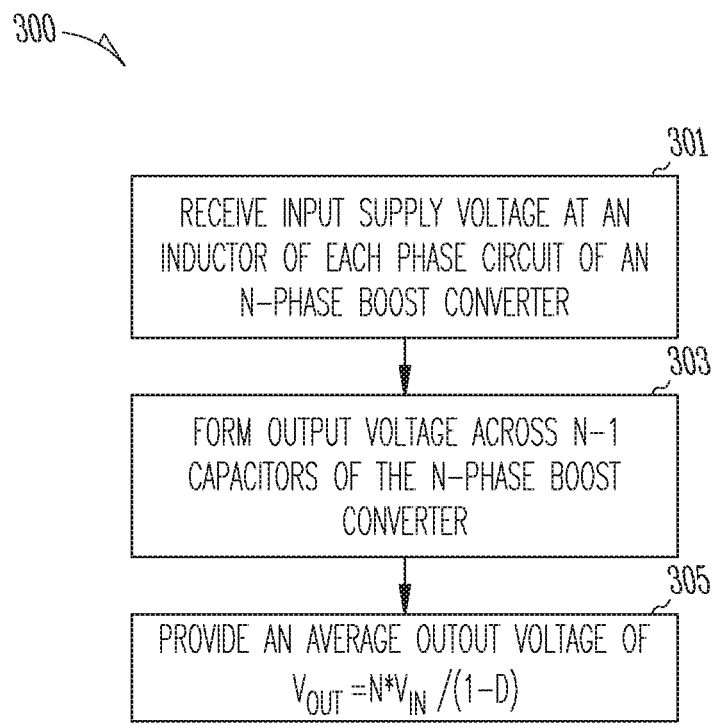
FIG. 3 illustrates generally a flowchart of an example method of operation of a MPSCI boost converter according to the present subject matter.

FIG. 3 illustrates generally a flowchart of an example method of operation of a MPSCI boost converter according to the present subject matter. At 301, the method can include receiving an input supply voltage (VIN) at an inductor of each of the N phases, where N is an integer number greater than 1. At 303, output voltage of the MPSCI boost converter can be formed across N−1 capacitors of the N-phase voltage boost converter. At 305, the MPSCI boost converter can provide an average output voltage (VOUT) given by, $$VOUT = N*VIN/(1-D),$$

where D is an average duty cycle associated with inducing the current in each inductor of the N phases. In certain examples, forming the output voltage can include inducing a current in each inductor of each of the N phase at a different instance of a switching period of a first phase of the N phases. For example, if the MPSCI boost converter includes two phases, current ($I_{L1}$) can be induced in a first phase of the MPSCI boost converter using a bottom switch that is turned "on" at a given frequency of the clock of a controller of the MPSCI boost converter such that, the bottom switch of the first phase turns on each period (T1) of the switching frequency. Accordingly, the bottom switch of the second phase can be triggered to turn "on" during the period (T1) when the bottom switch of the first phase is triggered to turn "on". In some examples, the bottom switch of the second phase is triggered to turn "on" at a mid-point of the period (T1) of, or interval between when, the bottom switch of the first phase is triggered to turn "on" and vice-versa. For a. MPSCI boost converter having more than 2 phases, each bottom switch of each phase can turn on in a staggered repeating pattern such that each turn "on" event of the bottom switches is separated by a T1/N interval, where T1 is the period of the switching frequency of the bottom switch of a first phase circuit and N is the number of phases.

In certain examples, a first node of each inductor of each phase circuit of the N-phase boost converter can be directly coupled to the supply voltage (VIN). A second node of each of the inductors can be selectively coupled to ground to induce the inductor current. The selective coupling of each inductor can be staggered across the switching period of each phase circuit. As an example, for an N-phase boost converter having a switching period of T for each phase circuit, a first phase circuit can induce inductor current at a time t0. A second phase circuit can induce inductor current at t0+T/N. A third phase circuit can induce inductor current a t0+2T/N, and so on. The N phase circuit can induce inductor current at time t0+(N−1)T/N. Each phase circuit can include a corresponding first switch, or bottom switch, to couple a second node of the corresponding inductor to ground to induce the inductor current. The "on"-time of the bottom switch can provide a basis of the duty cycle of the N-phase boost converter In a similar fashion, when the "on"-time of the first switch of each phase circuit terminates, the first switch isolates the corresponding inductor from ground and couples the induced current to an output of the phase circuit via a second or top switch. Except for the phase circuit that includes the output for the N-phase boost converter, each phase circuit output can couple to a capacitor of one other phase in a cascading fashion. The cascading nature of the phase circuits can allow the high boosting of the input voltage by a factor of N to provide the output voltage. In addition, the switches of the N-phase boost converter can be rated at a lower voltage than the output voltage as the design of the multiple-phase boost converter is not configured to expose any one of the top and bottom switches to the full output voltage when N is greater than 1. In addition, high boost can be achieved with relatively low switching frequency compared to single phase boost converters. In addition, high switching frequencies can be achieved using smaller transistor switches, thus, higher switching frequencies can be employed to provide even higher boost. In certain examples, the top switch of one or more of the phase circuits can be replaced by a diode or similar device for an asynchronous MPSCI boost converter.

Figure 4A:
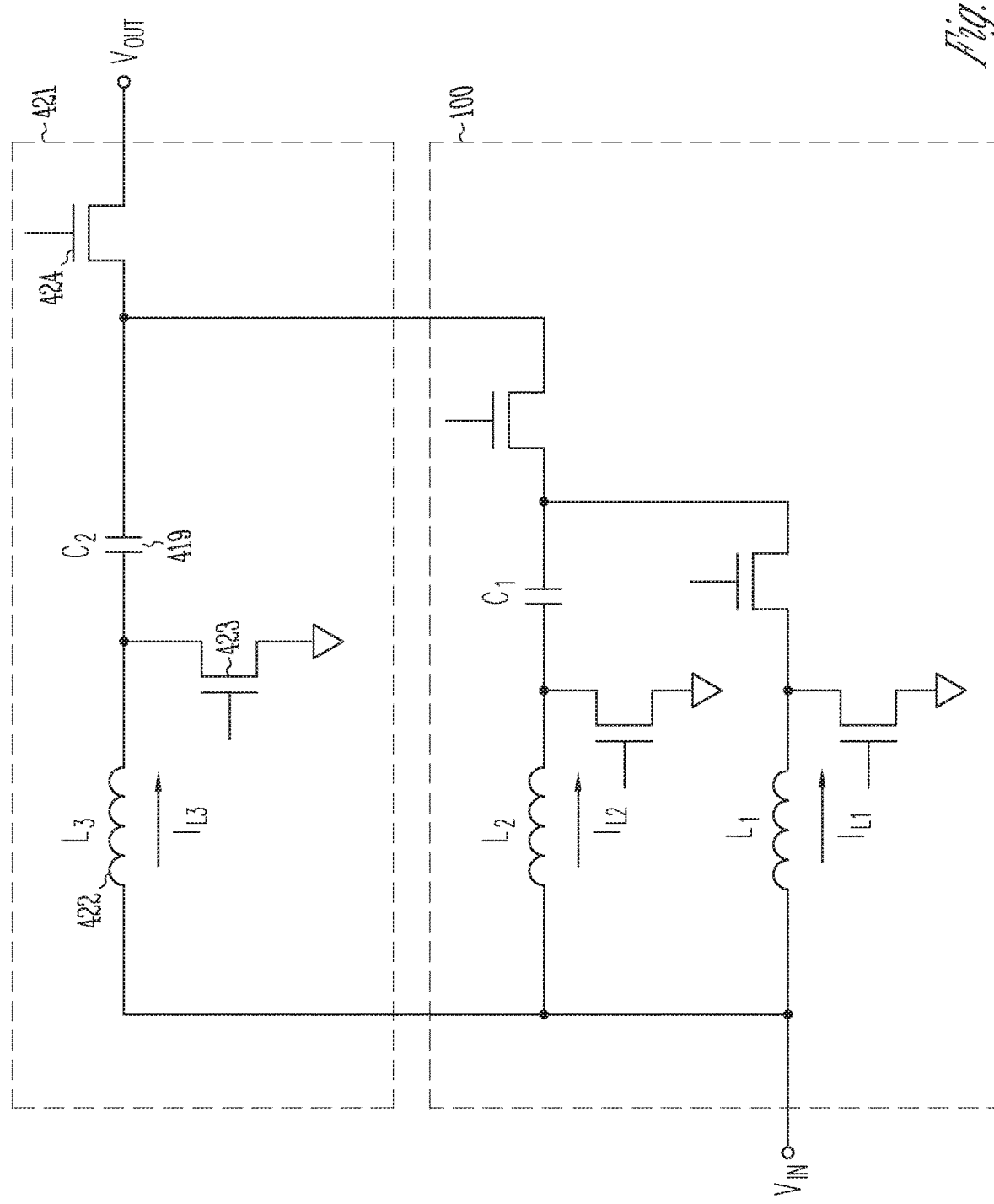
FIG. 4A illustrates generally an example 3-phase boost converter according to the present subject matter.
Figure 4B:
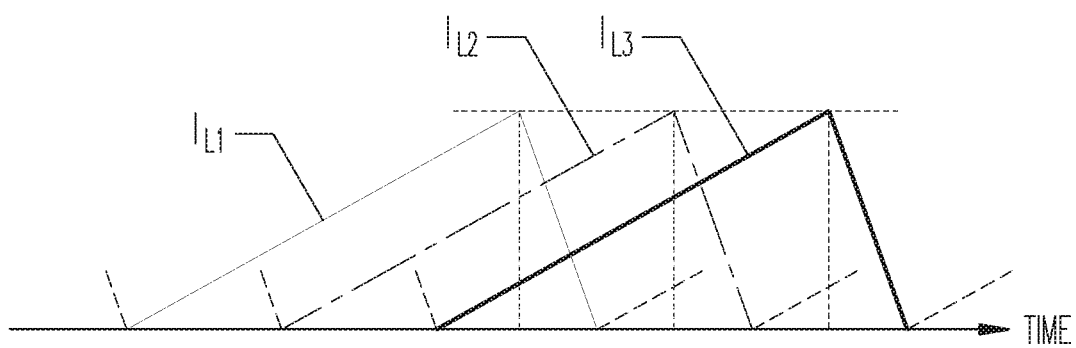
FIG. 4B illustrates graphically plots of the inductor current of each of the three phase circuits.

FIG. 4A illustrates generally an example three-phase boost converter 400 according to the present subject matter. In certain examples, the three-phase boost converter 400 can include a third phase circuit 421 connected to an output of a two-phase boost converter such as the two-phase boost converter 100 of FIG. 1. The third phase circuit 421 can include an inductor 422, a top switch 424, a bottom switch 423, and a capacitor 419. The three-phase boost converter 400 can include a controller (not shown) to control the top and bottom switches of each of the three phase circuits. In general, the controller can divide the switching period of any one of the phase circuits into three sub-intervals and can sequentially trigger the duty cycle of a bottom switch of a different one of the phase circuits at the beginning of each interval. The controller can also control the duty cycle of the bottom switches and the top switches. In general, the inductor current of the first phase circuit can charge the capacitor of the second phase circuit, the inductor current and capacitor voltage of the second phase circuit can charge the capacitor of the third phase circuit, and the capacitor voltage and inductor current of the third phase circuit can provide a boosted output voltage of the three-phase boost converter. FIG. 4B illustrates graphically plots of the inductor current of each of the three phase circuits with respect to time. The plots include the inductor current ($I_{L1}$) for the first phase circuit, the inductor current ($I_{L2}$) for the second phase circuit, and the inductor current ($I_{L3}$) for the third phase circuit. For each phase circuit, the controller can place the bottom switch in a low-impedance state to induce inductor current for a predetermined duty cycle. At the end of the duty cycle interval, the controller can place the bottom switch in a high impedance state and the top switch in a low-impedance state. In certain examples, the output voltage of the three-phase boost converter can be given by, $$VOUT=3*VIN/(1-D),$$

where D is an average duty cycle associated with inducing the current in each inductor of the three phases. For a duty cycle of 80%, the output voltage ($V_{OUT}$) can be 15~$V_{IN}$. In addition, the example architecture is configured such that none of the top switches, or the bottom switches, are individually exposed to the full output voltage. For example, the top switch of the third phase circuit can be exposed to the highest average voltage of the top and bottom switches and that voltage can be about ⅔ $V_{OUT}$. As such, the top and bottom switches can be rated for voltages less than the output voltage of the three-phase boost converter. Smaller switches tend to be more efficient and can generally operate at higher frequencies. In certain examples, the top switch of one or more of the phase circuits can be replaced by a diode or similar device for an asynchronous MPSCI boost converter.

Figure 5A:
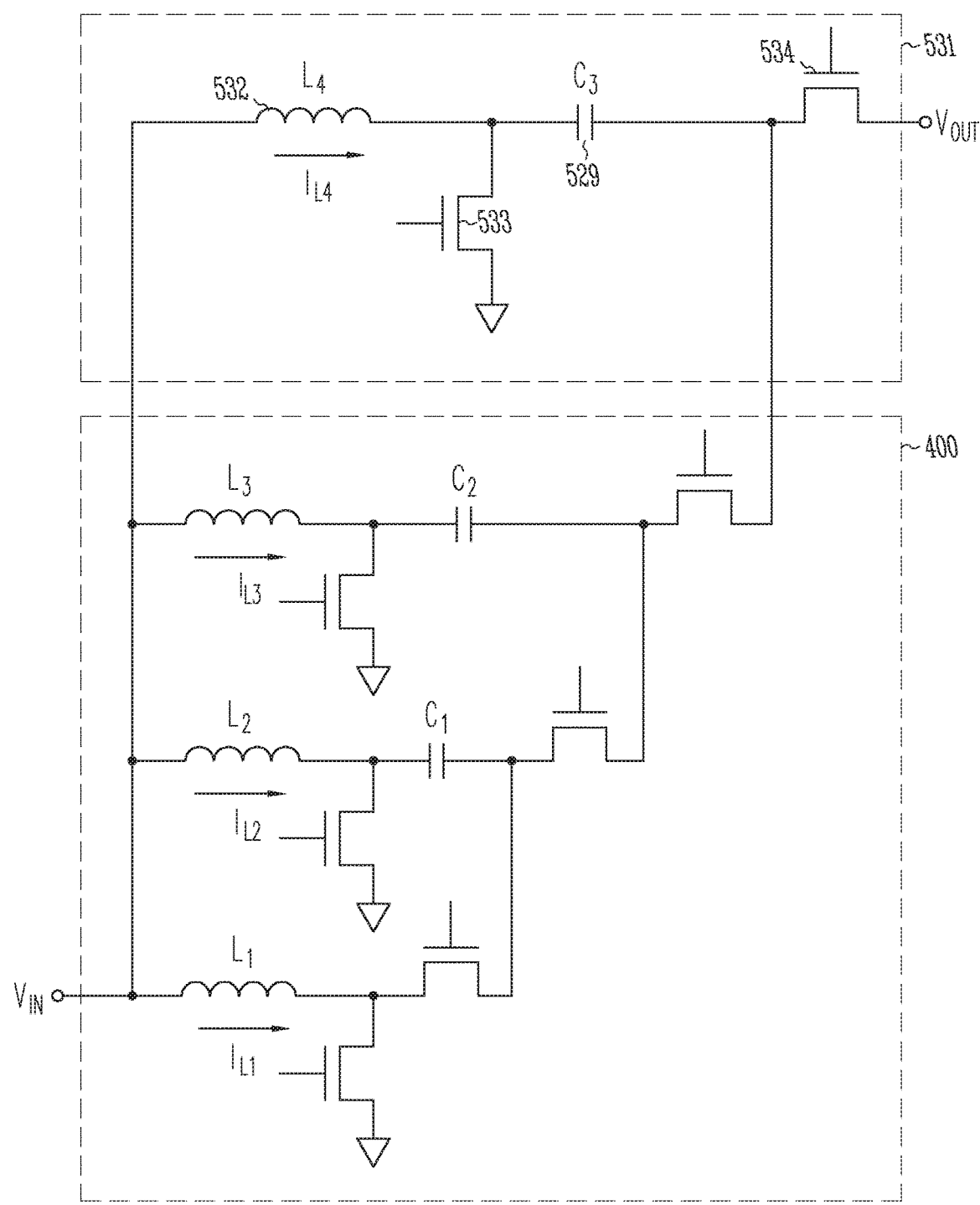
FIG. 5A illustrates generally an example four-phase boost converter according to the present subject matter.
Figure 5B:
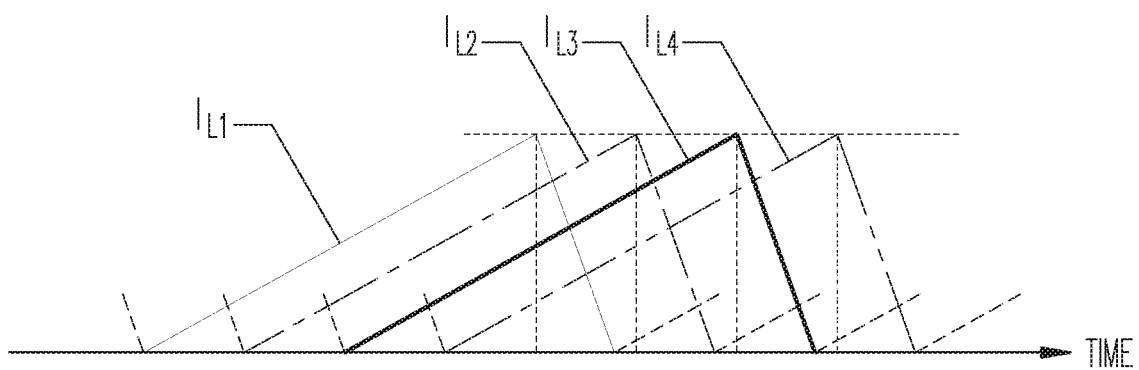
FIG. 5B illustrates graphically plots of the inductor current of each of the three phase circuits.

FIG. 5A illustrates generally an example four-phase boost converter 500 according to the present subject matter. In certain examples, the four-phase boost converter 500 can include a fourth phase circuit 531 connected to an output of a three-phase boost converter such as the three-phase boost converter 400 of FIG. 4. The fourth phase circuit 531 can include an inductor 532, a top switch 534, a bottom switch 533, and a capacitor 529. The four-phase boost converter 500 can include a controller (not shown) to control the top and bottom switches of each of the four phase circuits. In general, the controller can divide the switching period of any one of the phase circuits into four sub-intervals and can sequentially trigger the duty cycle of a bottom switch of a different one of the phase circuits at the beginning of each sub-interval. The controller can also control the duty cycle of the bottom switches and the top switches. In general, inductor current of the first phase circuit can charge the capacitor of the second phase circuit, the inductor current and capacitor voltage of the second phase circuit can charge the capacitor of the third phase circuit, the inductor current and capacitor voltage of the third phase circuit can charge the capacitor of the fourth phase circuit, and the capacitor voltage and inductor current of the fourth phase circuit can provide a boosted output voltage of the four-phase boost converter. FIG. 5B illustrates graphically plots of the inductor current of each of the four phase circuits. The plots include the inductor current (I1) for the first phase circuit, the inductor current (I2) for the second phase circuit, the inductor current (I3) for the third phase circuit, and the inductor current (I4) for the fourth phase circuit. For each phase circuit, the controller can place the bottom switch in a low-impedance state to induce inductor current for a predetermined duty cycle. At the end of the duty cycle interval, the controller can place the bottom switch in a high-impedance state and the top switch in a low-impedance state. In certain examples, the output voltage of the four-phase boost converter can be given by, $$VOUT=4*VIN/(1-D),$$

where D is an average duty cycle associated with inducing the current in each inductor of the four phases. For a duty cycle of 80%, the output voltage ($V_{OUT}$) can be 20·$V_{IN}$. In addition, the example architecture is configured such that none of the top switches, or the bottom switches, are exposed to the full output voltage. For example, the top switch of the fourth phase circuit can be exposed to the highest average voltage of all the top and bottom switches and that voltage can be about ¾ $V_{OUT}$. As such, the top and bottom switches can be rated for voltages less than the output voltage of the four-phase boost converter. Compared to switches rated for the full output voltage, in general lower voltage rated switches are smaller and smaller switches tend to be more efficient and can generally operate at higher frequencies. In certain examples, the top switch of one or more of the phase circuits can be replaced by a diode or similar device for an asynchronous MPSCI boost converter.

Figure 6:
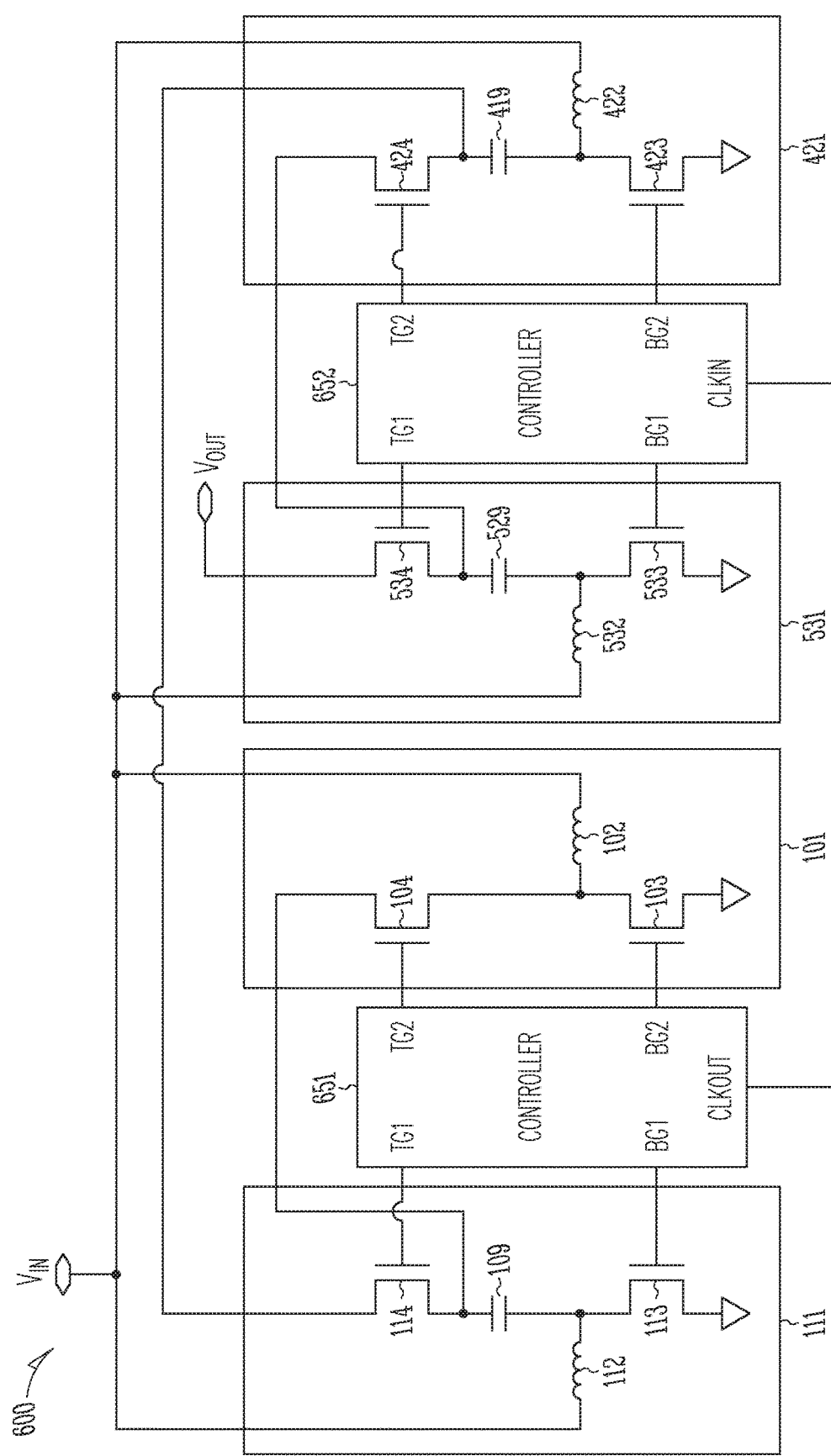
FIG. 6 illustrates generally an example implementation of a MPSCI boost converter including controllers.

FIG. 6 illustrates generally an example implementation 600 of a MPSCI boost converter including controllers. The implementation 600 is a four-phase SCI boost converter, such as that illustrated in FIG. 5, that includes two poly-phase synchronous boost controllers 651, 652 such as two LTC3787 produced by Analog Devices, Inc., for example. Poly-phase synchronous controllers are typically used to couple single phase boost controllers in parallel at the output node of each boost controller. The present inventors have recognized that these existing controllers, along with the configuration of two or more phase circuits as discussed above, can provide the control signals for a multiple-phase SCI boost converter to produce high boost with switches that do not need to be rated for the full output voltage of the multiple-phase SCI boost converter. Along with the two controllers 651, 652 that share a clock signal 653, the example implementation 600 can include a first phase circuit 101, a second phase circuit 111, a third phase circuit 421, and a fourth phase circuit 531. Each phase circuit can include a top switch 104, 114, 424, 534, a bottom switch 103, 113, 423, 533, and an inductor 102, 112, 422, 532 coupled directly with the input voltage supply ($V_{IN}$). The second phase circuit 111, the third phase circuit 421 and the fourth phase circuit 531 can each include a capacitor 109, 419, 529 as discussed above. In one example, the implementation 600 can operate with a switching frequency of about 400 kHz and a 92% duty cycle. With $V_{IN}$=5 volts, the implementation 600 can provide an output voltage ($V_{OUT}$) of about 250 volts. Such high boost can be advantageous for, among other things, applications such as fixed or mobile light detection and ranging (LIDAR) sensor or system and light-emitting diode (LED) drivers.

It is understood that the example implementation can include additional circuitry without departing from the scope of the present subject matter. Such additional circuitry can include, but is not limited to, a base oscillator, filters, sensing and diagnostics, etc.

Compared to conventional boost converters, MPSCI boost converters according to the present subject matter can use power switches that can be rated less than the output voltage of the MPSCI converter. Smaller switches typically result in lower switch losses, less thermal generation, smaller board size and lower system cost. In addition, the smaller switches can allow the MPSCI boost converters to operate at higher frequencies because the switches do not have as high of parasitic capacitances. The higher frequencies can allow or even higher duty cycle, thus, higher boost.

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the even of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A multiple-phase switched-capacitor-inductor (MPSCI) boost converter comprising:
    a first phase circuit;
    a second phase circuit; and
    a capacitor;
    wherein each of the first phase circuit and the second phase circuit includes:
        a first switch;
        an inductor having a first node coupled to a first supply rail of the MPSCI boost converter; and
        a second switch configured to selectively couple a second node of the inductor to a second supply rail of the MPSCI boost converter; and
    wherein the capacitor is coupled between the second node of the inductor of the second phase circuit and the first switch of the second phase circuit.

2. The MPSCI boost converter of claim 1, wherein the first switch of the second phase circuit is configured to selectively couple the second node of the inductor of the second phase circuit with the capacitor.

3. The MPSCI boost converter of claim 1, wherein the first switch of the first phase circuit is a diode.

4. The MPSCI boost converter of claim 1, wherein the first switch of the second phase circuit is a diode.

5. The MPSCI boost converter of claim 1, wherein the first switch of the first phase circuit and the first switch of the second phase circuit is a diode.

6. The MPSCI boost converter of claim 1, including a clock generator coupled to a control node of the second switch of the first phase circuit and a control node of the second switch of the second phase circuit.

7. The MPSCI boost converter of claim 6, including control circuitry configured to activate the second switch of the first phase circuit on a transition of a first clock signal of the clock generator; and
    wherein the first phase circuit includes a first comparator circuit configured to deactivate the second switch of the first phase circuit when a first inductor current of the inductor of the first phase circuit satisfies a first peak current threshold.

8. The MPSCI boost converter of claim 7; wherein the control circuitry is configured to activate the second switch of the second phase circuit on a transition of a second clock signal of the clock generator; and
    wherein the second phase circuit includes a second comparator circuit configured to deactivate the second switch of the second phase circuit when a second inductor current of the inductor of the second phase circuit satisfies a second peak current threshold.

9. A method of operating a N-phase switched-capacitor-inductor (SCI) boost converter, wherein N is an integer number greater than 1, the method comprising:
    receiving an input supply voltage (VIN) at an inductor of each phase circuit of the N-phase SCI boost converter;

forming an output voltage of the N-phase SCI boost converter across N−1 capacitors of the N-phase SCI boost converter; and providing an average output voltage (VOUT) given by, VOUT=N*VIN/(1−D), where D is a duty cycle of the N-phase SCI boost converter.

10. The method of claim 9, wherein forming the output voltage includes inducing a current in each inductor at a different instance of a switching period of a first phase of the N phases.

11. The method of claim 10 wherein receiving an input supply voltage at an inductor of each of the N phases includes receiving an input supply voltage at a first node of a first inductor of a first phase circuit of the N-phase SCI boost converter; and wherein inducing a current in each inductor includes coupling a second node of the first inductor to ground to provide a first current in the first inductor.

12. The method of claim 11, wherein forming an output voltage includes uncoupling the second node of the first inductor from ground.

13. The method of claim 12, wherein forming an output voltage includes coupling the second node of the first inductor to a first capacitor of the N−1 capacitors, wherein the first capacitor is selectively coupled to an inductor of a second phase circuit of the N-phase SCI boost converter.

14. The method of claim 13, wherein receiving an input supply voltage at an inductor of each of the N phases includes:

receiving the input supply voltage at a first node of a second inductor of the second phase circuit of the N-phase SCI boost converter; and wherein inducing a current in each inductor includes coupling a second node of the second inductor to ground to provide a second current in the second inductor.

15. The method of claim 14, herein forming an output voltage includes uncoupling the second node of the second inductor from ground to divert the second current to the first capacitor.

16. The method of claim 15, wherein forming an output voltage includes coupling the first capacitor to an output node of the second phase circuit of the N-phase SCI boost converter.

17. The method of claim 11, wherein inducing a current in each inductor includes switching a first switch of each phase circuit of the N-phase SCI boost converter to couple a second node of each inductor of each phase circuit to ground; and wherein forming the output voltage includes selectively coupling each capacitor of N−1 phase circuits of the N-phase SCI boost converter to a respective output of each phase circuit of the N−1 phase circuits.

18. A system comprising:

a load;

a multiple-phase switched-capacitor-inductor (MPSCI) voltage converter configured to receive an input voltage (VIN) and to provide an average output voltage (VOUT) to the load; and wherein the MPSCI voltage converter is configured to boost the output voltage based on a number (N) of phases of the MPSCI voltage converter and a duty cycle of the MPSCI voltage converter such that the average output voltage (VOUT) is given by, $$VOUT=N*VIN/(1-D),$$

wherein D is an average duty cycle associated with inducing current in each inductor of the N phases.

19. The system of claim 18, wherein the load includes a light detection and ranging (LIDAR) sensor.

20. The system of claim 8, wherein the load includes a light-emitting diode driver.

21. A method of operating a N-phase switched-capacitor-inductor (SCI) boost converter, wherein N is an integer number greater than 1, the method comprising:

receiving an input supply voltage (VIN) at a first node of an inductor of each phase circuit of the N-phase SCI boost converter; and selectively coupling and isolating a second node of the inductor of each phase circuit with ground to form an output voltage of the N-phase SCI boost converter across N−1 capacitors of the N-phase SCI boost converter, wherein each capacitor of the N−1 capacitors is coupled in series between a second node of a corresponding inductor of each phase circuit and an output node of the N-phase SCI boost converter.

22. The method of claim 21, wherein, for a given duty cycle and a given input supply voltage (VIN), the output voltage is proportional to the number of phases of the N-phase SCI boost converter.

23. The method of claim 21. wherein the selectively coupling and isolating a second node of the inductor of each phase circuit with ground includes inducing a current in each inductor at a different instance of a switching period of a first phase of the N phases.

24. The method of clam 21, further comprising, providing an average output voltage.

25. The method of claim 24, wherein the average output is based on a duty cycle of the N-phase SCI boost converter.

* * * * *